United States Patent [19]
Tanifuji et al.

[11] Patent Number: 5,462,998
[45] Date of Patent: Oct. 31, 1995

[54] VINYL CHLORIDE POLYMERIZATION PROCESS USING BALL VALVES IN RECYCLE LINE

[75] Inventors: Yoichi Tanifuji, Matsudo; Yasuhiro Yamamoto, Ibaraki, both of Japan

[73] Assignee: Shin-Etsu Chemical Co., Ltd., Tokyo, Japan

[21] Appl. No.: 285,297

[22] Filed: Aug. 3, 1994

[30] Foreign Application Priority Data

Aug. 3, 1993 [JP] Japan ................................. 5-210936

[51] Int. Cl.⁶ ................................................ C08F 14/06
[52] U.S. Cl. .......................... 526/67; 526/74; 526/344.2; 526/345
[58] Field of Search ................................. 526/67, 344.2, 526/345, 74

[56] References Cited

U.S. PATENT DOCUMENTS

| | | | |
|---|---|---|---|
| 4,340,701 | 7/1982 | Willmore et al. | 526/68 |
| 4,543,399 | 9/1985 | Jenkins, III et al. | 526/68 |

Primary Examiner—Joseph L. Schofer
Assistant Examiner—Tom Weber
Attorney, Agent, or Firm—Sughrue, Mion, Zinn, Macpeak & Seas

[57] ABSTRACT

A polymerization apparatus equipped with a circuit made up of a polymerization vessel, a heat exchanger placed outside said polymerization vessel, and a circulation pipeline extending from said polymerization vessel and returning to said polymerization vessel through said heat exchanger, a branch pipeline being connected to said circulation pipeline through a ball valve comprising a spherical valve element and a valve body for housing said spherical valve element, wherein the valve body of said ball valve is joined directly to said circulation pipeline, and a method of producing a polymer of a monomer having an ethylenically unsaturated double bond by using said apparatus. Scale and polymers in the form of blocks can be prevented from mixing with the reaction mixture. Therefore, where the obtained polymer is formed into a sheet or the like, the fish eyes can be decreased, and if the polymerization is repeated, clogging of the tubes of the heat exchanger and drop in the flow velocity of the reaction mixture can be prevented.

2 Claims, 4 Drawing Sheets

A

B

VINYL CHLORIDE POLYMERIZATION PROCESS USING BALL VALVES IN RECYCLE LINE

BACKGROUND OF THE INVENTION

1. Field of the Invention

The present invention relates to a polymerization apparatus for polymerizing a monomer having an ethylenically unsaturated double bond by polymerizing the monomer while circulating the reaction mixture through a heat exchanger placed separately from a polymerization vessel and a method of producing a polymer by using said polymerization apparatus.

2. Description of the Prior Art

Polymerization of a monomer having an ethylenically unsaturated double bond is carried out in such a manner that a polymerization medium, such as water, a dispersant, a polymerization initiator, the monomer having an ethylenically unsaturated double bond, and, if necessary, other various additives are charged into a polymerization vessel equipped with a water jacket and a reflux condenser, then the temperature in the polymerization vessel is elevated, and the polymerization reaction is performed with the temperature kept constant. During that polymerization reaction, to keep the temperature in the polymerization vessel constant, since it is required to remove the heat of the polymerization reaction, cooling water is circulated through the water jacket and the reflux condenser.

In recent years, in order to improve the productivity, it is carried out to (1) make the size of a polymerization vessel large, and (2) shorten the polymerization time per batch. However as the size of polymerization vessels is made large, since the ratio of the heating surface area for the reaction mixture to a unit volume is decreased, the conventional method of removing the heat of polymerization reaction becomes unsatisfactory in the capacity of removing the heat. Further, if the polymerization time per batch is shortened, since the rate of heat generation due to the polymerization reaction per unit time is increased, the capacity of removing heat becomes unsatisfactory.

Several methods of overcoming these disadvantages are suggested and, among them, as an effective method can be mentioned one in which the reaction mixture is circulated through a heat exchanger placed outside a polymerization vessel (see Japanese Pre-examination Patent Publication (KOKAI) Nos. 54-24991, 56-47410, and 58-32606 and Japanese Patent Publication (KOKOKU) No. 64-11642). This method is quite efficient in that the ratio of the heating surface area for the reaction mixture to a unit volume can be increased.

However, according to this method, there are problems of the operation and the quality that due to polymers in the form of scale or blocks produced in the circuit consisting of the heat exchanger and the circulation pipeline connecting that heat exchanger to the polymerization vessel, tubes of the heat exchanger are clogged or fish eyes are increased when the obtained polymer is formed into a sheet or the like.

SUMMARY OF THE INVENTION

Therefore, an object of the present invention is to provide a polymerization apparatus equipped with a circuit made up of a polymerization vessel, a heat exchanger placed outside said polymerization vessel, and a circulation pipeline extending from said polymerization vessel and returning to said polymerization vessel through said heat exchanger, which can prevent deposition of polymer scale and formation of polymers in the form of blocks in the circuit and can produce a polymer which when formed into a sheet or the like can give an item having less fish eyes and a method of producing a polymer of the above monomer by using said polymerization apparatus.

The present invention provides a polymerization apparatus comprising a circuit made up of a polymerization vessel, a heat exchanger placed outside said polymerization vessel, and a circulation pipeline extending from said polymerization vessel and returning to said polymerization vessel through said heat exchanger, a branch pipeline being connected to said circulation pipeline through a ball valve comprising a spherical valve element and a valve body for housing said spherical valve element, wherein the valve body of said ball valve is joined directly to said circulation pipeline.

The present invention also provides a method of producing a polymer comprising the step of polymerizing a monomer having an ethylenically unsaturated double bond using a polymerization apparatus comprising a circuit comprised of a polymerization vessel, a heat exchanger placed outside said polymerization vessel, and a circulation pipeline extending from said polymerization vessel and returning to said polymerization vessel through said heat exchanger, a branch pipeline being connected to said circulation pipeline through a ball valve comprising a spherical valve element and a valve body for housing said spherical valve element, wherein the valve body of said ball valve is joined directly to said circulation pipeline.

According to the present polymerization apparatus, deposition of polymer scale and formation of polymers in the form of blocks in the circuit can be reduced. Therefore, according to the present method of producing a polymer by using said polymerization apparatus, where the obtained polymer is formed into a sheet or the like, the fish eyes can be decreased. Further, the present polymerization apparatus improves the productivity since, even if polymerization is repeated, clogging of the tubes of the heat exchanger or drop in the flow velocity of he reaction mixture is prevented.

DETAILED DESCRIPTION OF PREFERRED EMBODIMENTS

According to the study made by the present inventors, it has been confirmed that deposition of polymer scale and formation of polymers in the form of blocks in a circuit in conventional polymerization apparatuses are apt to occur particularly at the part where a circulation pipeline and a branch pipeline, such as a slurry recovering pipeline, a drain pipeline, and a by-pass pipeline, are connected. This is attributed to the assumption that the branch pipeline is connected to the circulation pipeline through a ball valve and although the ball valve is in the closed state during the circulation of the reaction mixture, in the conventional polymerization apparatus, a so-called dead space is present between the ball valve that is in the state closed to the circulation pipeline and the valve element and the flow of the reaction mixture is liable to stagnate in that dead space.

Now a specific embodiment of the part where a circulation pipeline and a branch pipeline are connected in a conventional polymerization apparatus is described with reference to FIG. 3.

Figure 3:
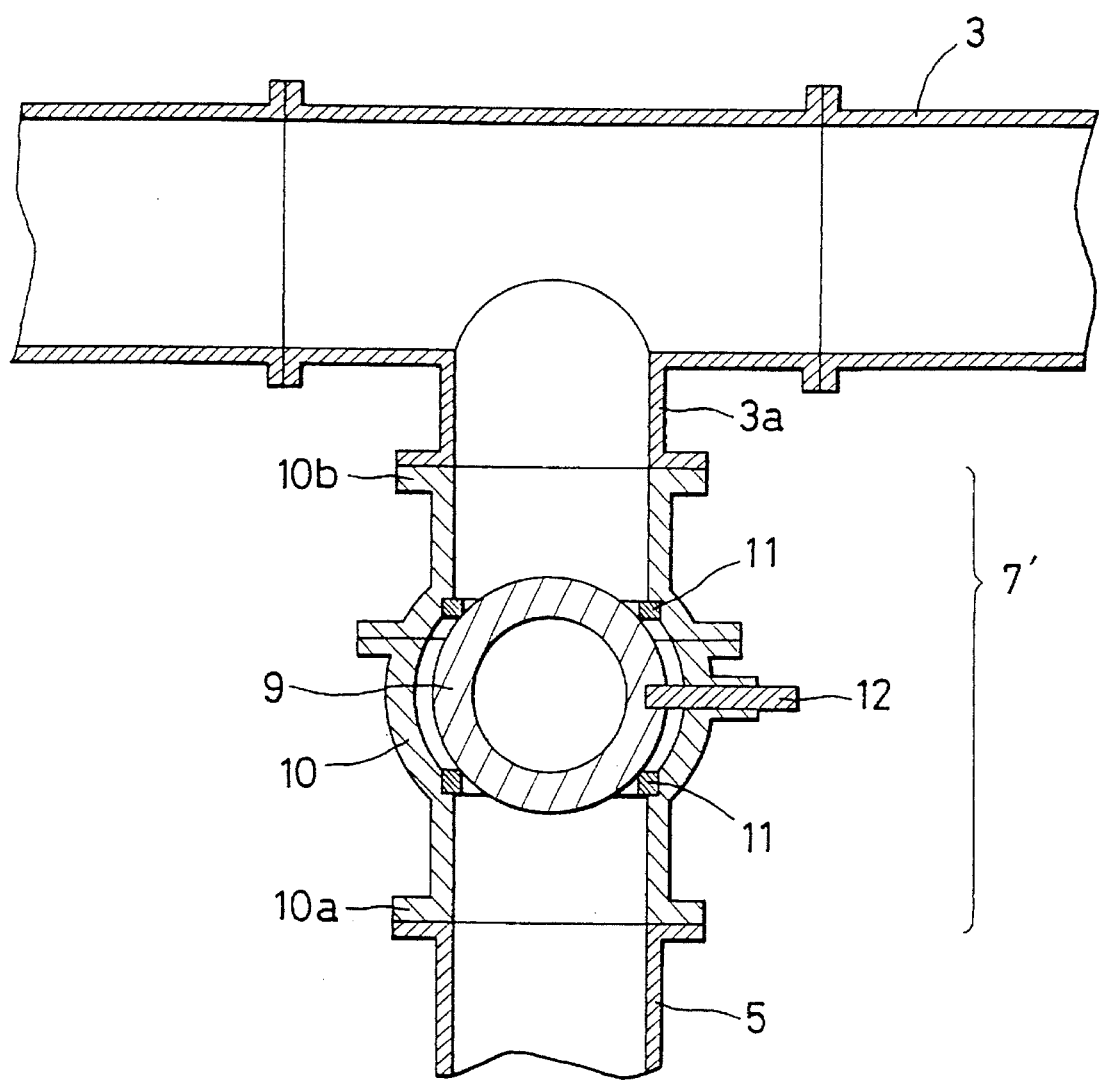
FIG. 3 is a vertical sectional view of the part where a circulation pipeline and a branch pipeline are connected in a conventional polymerization apparatus, the view being taken along the axis of the circulation pipeline, wherein a ball valve is in the closed state.

FIG. 3 is a vertical sectional view of the part where a circulation pipeline and a branch pipeline are connected in a conventional polymerization apparatus, the view being taken along the axis of the circulation pipeline, wherein a ball valve is in the closed state. The branch pipeline 5 is connected to the circulation pipeline 3 through a ball valve 7'. The ball valve 7' is made up of a spherical valve element 9 and a valve body 10 for housing the valve element 9 and the valve element 9 is supported rotatably and substantially .closely in the valve body 10 through a ring-shaped valve seat 11. An operating shaft 12 for rotating the valve element 9 is inserted in the ball valve 7'. The ball valve 7' has flanges 10a and 10b for connecting the ball valve to the branch pipeline 5 and the circulation pipeline 3. The circulation pipeline 3 is furnished with a flanged branch pipe 3a to be connected to that flange 10b.

In the conventional polymerization apparatus, since the ball valve and the circulation pipeline are connected by using flanges, as described above the ball valve has to be furnished with the flange 10b and the circulation pipeline has to be furnished with the flanged branch pipe 3a. Therefore, there is a considerably deep dead space between the circulation pipeline 3 and the valve element 9 and in that dead space, polymer scale is deposited or polymers in the form of blocks are produced in the dead space.

In the present polymerization apparatus, a branch pipeline is connected to a circulation pipeline through a ball valve of which valve body is joined directly to the circulation pipeline. Therefore, since the depth of the dead space between the circulation pipeline and the valve element of the ball valve can be made smaller than that of the conventional polymerization apparatus, deposition of polymer scale and formation of polymers in the form of blocks can be suppressed more. The valve body may be joined to the circulation pipeline, for example, by welding.

A specific embodiment of the part where the circulation pipeline and the branch pipeline are connected in the present polymerization apparatus is now described with reference to FIGS. 1 and 2.

Figure 1:
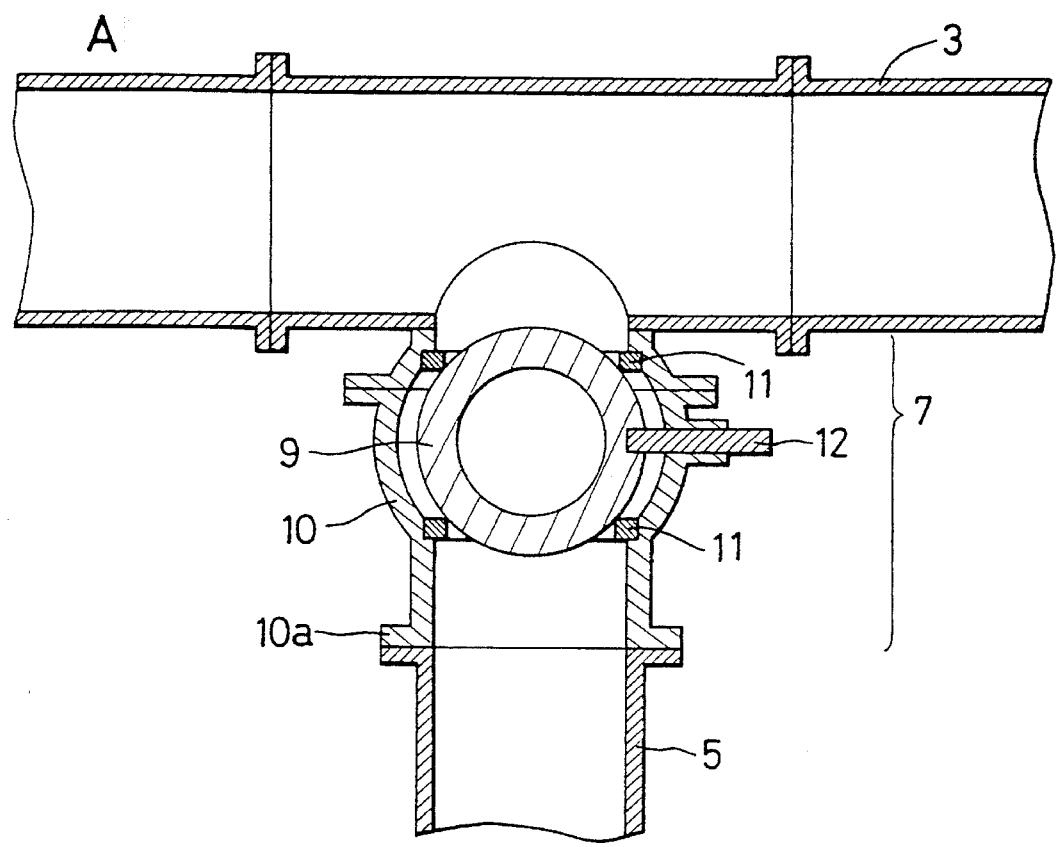
FIG. 1 is a vertical sectional view of the part where a circulation pipeline and a branch pipeline are connected in the present polymerization apparatus, the view being taken along the axis of said circulation pipeline, wherein Fig. A is a diagram showing that a ball valve is in the closed state and FIG. B is a diagram showing that the ball valve is in the opened state.
Figure 1:
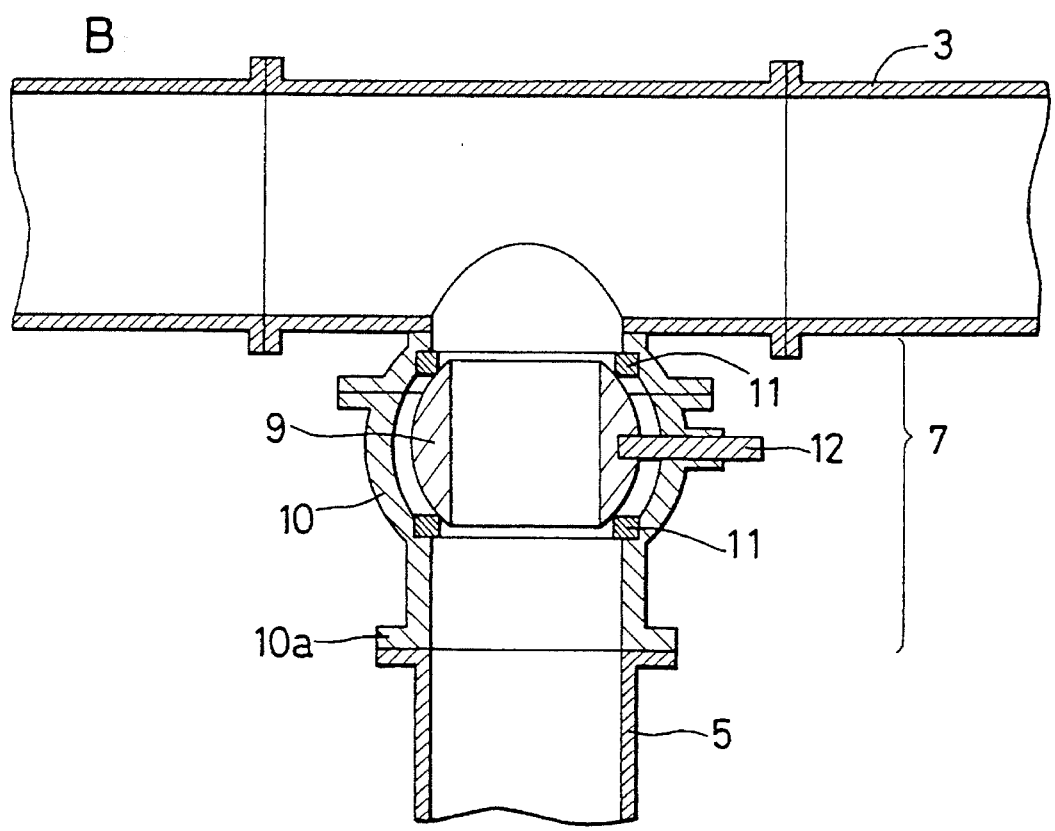
Figure 2:
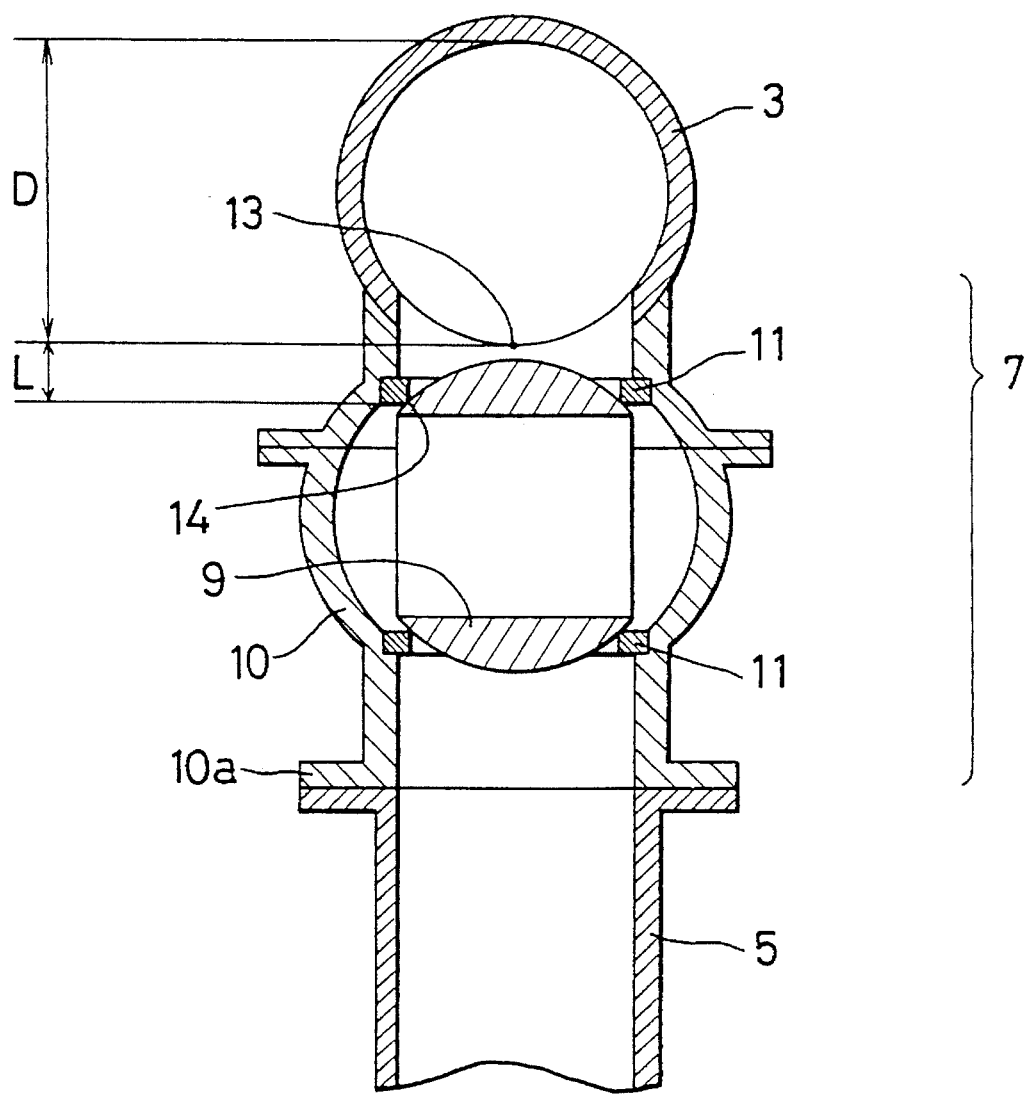
FIG. 2 is a transverse sectional view of the part where the circulation pipeline and the branch pipeline are connected in the present polymerization apparatus, the view being taken on a plane normal to the axis of the circulation pipeline passing through the axis of the branch pipeline, wherein the ball is in the closed state.

FIG. 1 is a vertical sectional view of the part where a circulation pipeline and a branch pipeline are connected in the present polymerization apparatus, the view being taken along the axis of said circulation pipeline, wherein FIG. A is a diagram showing that a ball valve is in the closed state and FIG. B is a diagram showing that the ball valve is in the opened state. FIG. 2 is a transverse sectional view of the part where the circulation pipeline and the branch pipeline are connected in the present polymerization apparatus, the view being taken on a plane normal to the axis of the circulation pipeline passing through the axis of the branch pipeline, wherein the ball is in the closed state. The branch pipeline 5 is joined to the circulation pipeline 3 through the ball valve 7. The ball valve 7 is made up of a spherical valve element 9 and a valve body 10 for housing the valve element 9 and the valve element 9 is supported rotatably and substantially closely in the valve body 10 through a ring-shaped valve seat 11. An operating shaft 12 for rotating the valve element 9 is inserted in the ball valve 7' and the ball valve 7' has a flange 10a for joining the ball valve to the branch pipeline 5. Further, the valve body 10 of the ball valve 7 is connected directly to the circulation pipeline 3, for example, by welding.

In the present polymerization apparatus, as described above, since the valve body 10 of the ball valve 7 is connected directly to the circulation pipeline 3, that is, the ball valve is joined to the circulation pipeline without using any flanges, the depth of the dead space between the circulation pipeline and the valve element can be minimized. Therefore, deposition of polymer scale and formation of polymers in the form of blocks can be reduced.

The smaller that dead space is, the more preferable it is. Specifically, the depth L of the dead space in FIG. 2 (the distance between the line passing through the lowest point 13 on the inner surface of the circulation pipeline 3 and the line passing the lowest point 14 of the dead space) is preferably equal to or below ¼, more preferably ¹⁄₁₀, of the inner diameter D of the circulation pipeline.

The polymerization apparatus

Now, an embodiment of the present polymerization apparatus is described with reference to FIG. 4.

Figure 4:
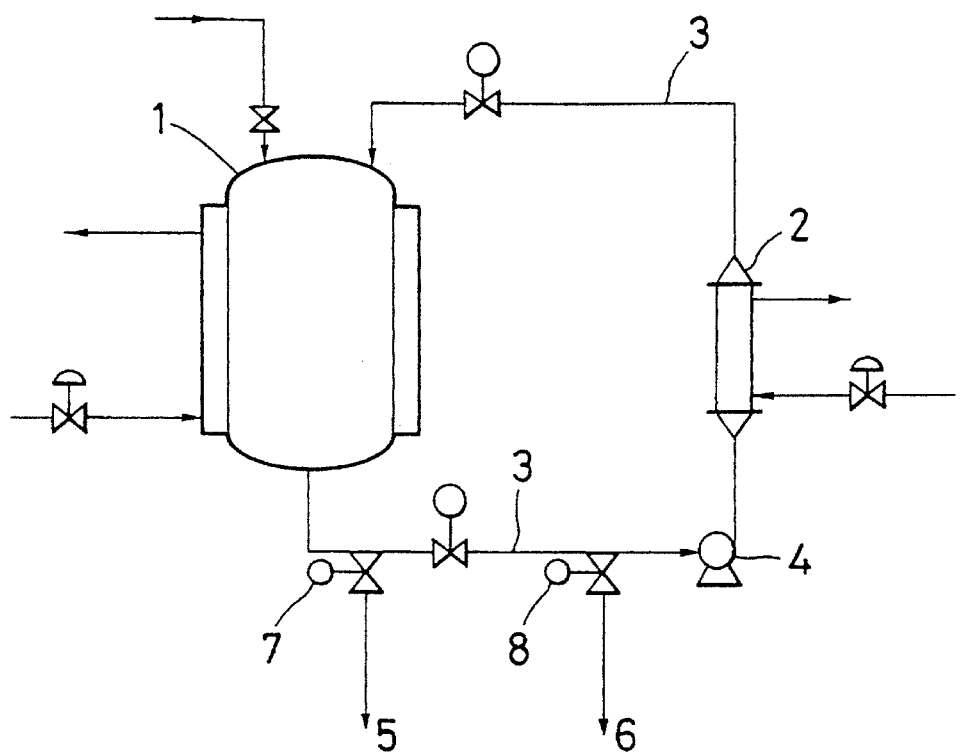
FIG. 4 is an exemplary diagram showing schematically the whole of the present polymerization apparatus.

FIG. 4 is an exemplary diagram showing schematically the whole of the polymerization apparatus according to the present invention. The present polymerization apparatus is equipped with a polymerization vessel 1, a heat exchanger 2 for heating or cooling a reaction mixture, and a circulation pipeline 3 extending from the bottom of the polymerization vessel 1 and returning to the polymerization vessel 1 through the heat exchanger 2. The present polymerization apparatus is equipped with a circulating pump 4 in the course of the circulation pipeline 3. Further, the polymerization apparatus is equipped with a slurry recovering pipeline 5 and a drain pipeline 6 as branch pipelines, which are connected to the circulation pipeline 3 through ball valves whose valve bodies are directly joined to the circulation pipeline 3.

In the present polymerization apparatus, an aqueous reaction mixture made up of a monomer, an aqueous medium, a dispersant, an oil-soluble polymerization initiator, etc. charged into the polymerization vessel 1 is drawn out from the bottom of the polymerization vessel 1 by the circulating pump 4 to reach through the circulation pipeline 3 the heat exchanger 2, where the aqueous reaction mixture is cooled or heated, and then the reaction mixture is returned again through the circulation pipeline 3 to the gaseous phase or liquid phase in the polymerization vessel 1.

The polymerization vessel 1 in the present polymerization apparatus can be of the conventionally known type of polymerization vessel equipped with an agitator, a reflux condenser, a baffle or a water jacket, and the like. As the agitator, an agitator having agitating blades of the paddle type, Pfaudler type, Brumagin type, propeller type, turbine type, and the like is used, if necessary, in combination with a baffle, for example, of a plane plate, a cylinder, or a hairpin coil.

As the heat exchanger 2, a conventionally used heat exchanger, for example, of the shell and tube type, the coil type, the spiral type, or the trombone cooler type can be applied and as the heating or cooling medium thereof, steam, cooling water, brine and the like can be used. The circulation pipeline 3 may itself be a double pipeline to increase the efficiency of removal of heat by passing cooling water or brine through the outer space of the double pipeline.

The circulating pump 4 is desirably of a low-shearing type and is preferably a pump having a structure wherein an impeller has a single helical blade attached to a conical hub. As the pump having such a structure, for example, a pump commercially available under the trade name of Hidrostal Pump (manufactured by Taiheiyo Kinzoku KK) can be mentioned.

The parts where the reaction mixture will come in contact, such as the polymerization vessel 1, the heat exchanger 2, the circulation pipeline 3, the circulating pump 4, and others including valves are preferably made of a stainless steel, such as the 18-8 austenite stainless steel, the 13 chromium ferrite stainless steel, the martensite stainless steel, the 18 chromium ferrite stainless steel, the high-chromium ferrite stainless steel, and the dual-phase austenite/ferrite stainless steel. These parts may be coated with a conventionally known polymer scale preventive agent or that polymer scale preventive agent may be added to the aqueous suspension mixture.

The monomer having an ethylenically unsaturated double bond to be polymerized by the present polymerization apparatus includes, for example, a vinyl halide, such as vinyl chloride; a vinyl ester, such as vinyl acetate and vinyl propionate; acrylic acid and methacrylic acid and their esters and salts; maleic acid and fumaric acid and their esters and anhydrides; a diene monomer, such as butadiene, chloroprene, and isoprene; styrene; acrylonitrile; a vinylidene halide; and a vinyl ether.

The present polymerization apparatus is suitable for producing particularly a vinyl chloride polymer, for example, of vinyl chloride out of the above monomers. The vinyl chloride polymer includes, in addition to vinyl chloride homopolymers, a copolymer of vinyl chloride with other vinyl monomer (generally containing 50% by weight or more of vinyl chloride). The comonomer to be copolymerized with vinyl chloride includes, for example, an α-olefin, such as ethylene, propylene, 1-butene, 1-pentene, 1-hexene, 1-heptene, 1-octene, 1-nonene, 1-decene, 1-undecene, 1-dodecene, 1-tridecene, and 1-tetradecene; an acrylic acid and its ester, such as acrylic acid, methyl acrylate and ethyl acrylate; a methacrylic acid and its ester, such as methacrylic acid, methyl methacrylate and ethyl methacrylate; maleic acid and its ester: a vinyl ester, such as vinyl acetate and vinyl propionate; a vinyl ether, such as lauryl vinyl ether and isobutyl vinyl ether; maleic anhydride; acrylonitrile; styrene; vinylidene chloride; and other monomers copolymerizable with vinyl chloride, which may be used singly or as a combination of two or more.

The present polymerization apparatus is suitable for the polymerization in an aqueous medium, such as the suspension polymerization and the emulsion polymerization.

Now, a general method of producing a polymer by using the present polymerization apparatus is described specifically with reference to examples of suspension polymerization and emulsion polymerization.

First, water and a dispersant are charged into a polymerization vessel equipped with a water jacket. Thereafter, the inside of the polymerization vessel is evacuated to reduce the pressure to 0.1 to 760 mmHg and then a monomer is charged. At that time, generally the pressure in the polymerization vessel will become 0.5 to 30 kgf/cm$^2$.G. A polymerization initiator is charged before or after the monomer is charged. The polymerization is started by elevating the temperature in the polymerization vessel to 30° to 150° C. by passing hot water through the water jacket. Then, cooling water is passed through the water jacket and the reaction mixture in the polymerization vessel is circulated through a heat exchanger situated outside to perform the polymerization while keeping the inside of the polymerization vessel at the above temperature. During the polymerization, if required, water and one or more of dispersants and polymerization initiators are added. The reaction temperature at the time of the polymerization varies depending on the type of the monomer to be polymerized and for example in the case of vinyl chloride the polymerization is performed at 30° to 80° C. whereas in the case of styrene the polymerization is performed at 50° to 150° C. It is judged that the polymerization is completed when the internal pressure of the polymerization vessel has dropped to 0 to 7 kgf/cm$^2$.G, or when the difference between the inlet temperature and the outlet temperature of the cooling water flowed into and out from the water jacket placed around the outer circumference of the polymerization vessel has reached nearly zero (in other words, when the generation of heat due to the polymerization reaction has stopped). After the completion of the polymerization, the unreacted monomer is recovered and the produced polymer is drawn outside the polymerization vessel. The amounts of the water, the dispersant, and the polymerization initiator to be charged for the polymerization are generally 20 to 500 parts by weight, 0.01 to 30 parts by weight, and 0.01 to 5 parts by weight, respectively, per 100 parts by weight of the monomer.

Other conditions employed in this polymerization, such as the method of charging, for example, the aqueous medium, the monomer, the polymerization initiator, and the dispersant and the charging ratio of them, may be the same as those conventionally used. In this polymerization system, if required, for example, a polymerization regulator, a chain transfer agent, a pH adjuster, a gelation improper, an antistatic agent, a crosslinking agent, a stabilizer, a filler, an antioxidant, a buffer, and a polymer scale preventive agent that are suitably used in the vinyl chloride type polymerization are optionally added.

Now, a specific mode of the present invention will be described with reference to an Example and a Comparative Example, but the present invention is not restricted to the Example.

EXAMPLE 1

As shown in FIG. 4, a stainless steel jacketed polymerization vessel 1 having an internal volume of 2.1 m$^3$, a shell-and-tube heat exchanger 2 (tube inner diameter: 22.2 mm) having a heating surface area of 5.0 m$^2$, and a circulating pump, a Hidrostal Pump 4 (flow rate: 5 m$^3$/Hr; head: 2 m; equipped with an apparatus capable of changing the flow rate by an inverter) were connected through a circulation pipeline 3 (pipeline inner diameter: 3 inches), valves, etc. Branch pipelines 5 and 6 were connected through ball valves 7 and 8 whose valve bodies 10 were directly connected to the circulation pipeline 3 as shown in FIGS. 1 and 2. Incidentally, the depth of the dead spaces at the branch pipelines 5 and 6 was 19 mm.

A solution of 840 kg of deionized water, 240 kg of a partially saponified polyvinyl alcohol, and 160 kg of a cellulose ether was placed in the above polymerization vessel. After the inside of the polymerization vessel was evacuated to 50 mmHg, 670 kg of vinyl chloride monomer was charged into the polymerization vessel and then 2010 g of di-2-ethylhexyl peroxydicarbonate was pumped thereinto with stirring. Thereafter, hot water was passed through the water jacket of the polymerization vessel to elevate the temperature in the polymerization vessel. After the polymerization reaction was started, cooling water was passed through the water jacket, then after 30 min, the reaction mixture in the polymerization vessel was started to be circulated outside and at the same time cooling water at 30° C. was supplied to the heat exchanger at a rate of 10 m³/hr. The polymerization reaction was carried out with the internal temperature of the polymerization vessel kept at 55° C. and the reaction was stopped when the internal pressure of the polymerization vessel dropped to 6.5 kg/cm².G. Then, the unreacted monomer was recovered and the produced vinyl chloride polymer in the from of slurry was drawn out from the polymerization vessel and was dehydrated and dried.

With respect to the obtained vinyl chloride polymer, the bulk specific gravity, the particle size distribution, the plasticizer take-up, and the number of fish eyes of the sheet formed from the vinyl chloride polymer were measured by the methods shown below. The results are shown in Table 1.

(1) Bulk specific gravity: measured according to JIS K 6721.

(2) Particle size distribution: the vinyl chloride polymer was sifted through #60, #80, #100, #150, and #200 sieves according to JIS Z 8801 and the passed amounts were measured (in % by weight).

(3) Plasticizer take-up: Glass fiber was stuffed in the bottom of an aluminum alloy container having an inner diameter of 25 mm and a depth of 85 mm and a 10 g sample of the vinyl chloride polymer was placed in the bottom. 15 cc of dioctyl phthalate (hereinafter referred to as DOP) was added to the sample and it was allowed to stand for 30 min to cause the DOP to permeate well the polymer. Thereafter, the excess DOP was centrifuged under an acceleration of 1500 G and the amount of the DOP taken up by the 10 g of the polymer was measured and was multiplied by 10.

(4) Fish eyes: 100 parts by weight of the vinyl chloride polymer, 50 parts by weight of dioctyl phthalate, 0.5 parts by weight of tribasic lead sulfate, 1.5 parts by weight of lead stearate, 0.1 part by weight of titanium oxide, and 0.05 part by weight of carbon black were mixed and 25 g of the mixture was kneaded at 140° C. for 5 min by a 6-inch kneading roll and was formed into a sheet having a width of 15 cm and a thickness of 0.2 mm. The number of transparent grains per 100 cm² of the sheet was counted.

The state in the circulation pipeline after the completion of the polymerization was examined, the result being shown in Table 1.

Comparative Example 1

One operation of polymerization was carried out similarly to Example 1, except that the branch pipelines 5 and 6 were connected to the circulation pipeline 3 through ball valves that were joined to branch pipes 3a of the circulation pipeline through flanges 10b, as shown in FIG. 3. Incidentally the depth of the dead spaces in the branch pipelines was 100 mm.

With respect to the obtained vinyl chloride polymer, the bulk specific gravity, the particle size distribution, the plasticizer take-up, and the number of fish eyes of the sheet formed from the vinyl chloride polymer were measured in the same way as in Example 1. The results are shown in Table 1.

TABLE 1

|  |  | Example 1 | Comparable Example 1 |
|---|---|---|---|
| Bulk specific gravity |  | 0.527 | 0.524 |
| Particle size distribution (passed weight in %) | #60 | 100 | 100 |
|  | #80 | 73.2 | 74.0 |
|  | #100 | 38.6 | 39.7 |
|  | #150 | 20.1 | 19.8 |
|  | #200 | 1.0 | 0.9 |
| Plasticiser take-up (g) |  | 23.8 | 23.7 |
| Fish eyes (number) |  | 5 | 160 |
| State in the circulation pipeline |  | There was no polymer scale deposition and no polymers in for form of blocks were observed. | Polymer scale was deposited in the branch pipelines 5 and 6 and polymers in the form of blocks were formed. |

We claim:

1. A method of producing a polymer comprising the step of suspension polymerizing or emulsion polymerizing vinyl chloride or a mixture of vinyl chloride and other vinyl monomer containing at least 50% by weight of vinyl chloride using a polymerization apparatus comprising a circuit comprised of a polymerization vessel, a heat exchanger placed outside said polymerization vessel, and a circulation pipeline extending from said polymerization vessel and returning to said polymerization vessel through said heat exchanger, a branch pipeline being connected to said circulation pipeline through a ball valve comprising a spherical valve element and a valve body for housing said spherical valve element, wherein the valve body of said ball valve is joined directly to said circulation pipeline, and the distance between a line passing through the lowest point on said circulation pipeline and a line passing through the lowest point in the dead space between the valve body housing the spherical valve element and the circulation pipeline is $\leq \frac{1}{4}$ the inner diameter of the circulation pipeline.

2. A method of producing a polymer as in claim 1, wherein the amount of water charged for polymerization in an aqueous medium is 20 to 500 parts by weight per 100 parts by weight of the monomer.

* * * * *